United States Patent
Cuellar et al.

(10) Patent No.: US 9,088,565 B2
(45) Date of Patent: Jul. 21, 2015

(54) USE OF A PUBLIC KEY KEY PAIR IN THE TERMINAL FOR AUTHENTICATION AND AUTHORIZATION OF THE TELECOMMUNICATION USER WITH THE NETWORK OPERATOR AND BUSINESS PARTNERS

(75) Inventors: Jorge Cuellar, Baierbrunn (DE); Michael Marhöfer, Deisenhofen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1569 days.

(21) Appl. No.: 10/497,019

(22) PCT Filed: Nov. 29, 2001

(86) PCT No.: PCT/DE01/04461
§ 371 (c)(1),
(2), (4) Date: Jan. 21, 2005

(87) PCT Pub. No.: WO03/049365
PCT Pub. Date: Jun. 12, 2003

(65) Prior Publication Data
US 2005/0120202 A1 Jun. 2, 2005

(51) Int. Cl.
H04L 29/06 (2006.01)
H04W 12/06 (2009.01)
H04L 9/32 (2006.01)

(52) U.S. Cl.
CPC .......... H04L 63/0823 (2013.01); H04L 9/3268 (2013.01); H04W 12/06 (2013.01); H04L 63/0853 (2013.01); H04L 2209/56 (2013.01); H04L 2209/80 (2013.01)

(58) Field of Classification Search
CPC ............ H04L 63/0823; H04L 63/0853; H04L 9/3268; H04L 2209/56; H04L 2209/81; H04W 12/06

USPC ................... 380/239, 247; 713/156
See application file for complete search history.

(56) References Cited

U.S. PATENT DOCUMENTS 5,222,140 A * 6/1993 Beller et al. .................... 380/30
5,940,512 A * 8/1999 Tomoike ...................... 380/248
(Continued)

FOREIGN PATENT DOCUMENTS

EP 0 903 887 A2 3/1999
JP 8-223152 A 8/1996
(Continued)

OTHER PUBLICATIONS

Stefen Putz et al: "authentication schemes for third genertion mobile radio systems" Sep. 1998, pp. 126-130.*
(Continued)

*Primary Examiner* — Fikremariam A Yalew
(74) *Attorney, Agent, or Firm* — Slayden Grubert Beard PLLC

(57) ABSTRACT

A very efficient authentication and authorization check in n:m relationships is possible with a method for checking the entitlement of a user of a telecommunication terminal (1) to a service, whereby an access device (4) on a telecommunication network (3) obtains at least one certificate and a proof of identity (10) from the telecommunication terminal (1), whereupon NMT (5) together with a certification device (7) carries out a check of whether the certificate giving the identity is valid and has a positive status and whether particular authorization may be obtained from complementary certificates. Should the above be the case, a secret (for example a session key) is transmitted (15) to the access device (4) which is also sent (15, 16) to the telecommunication terminal (1, 2), encoded with at least the public key. The access device (4) is then activated with a policy corresponding to the rights of the telecommunication user.

13 Claims, 1 Drawing Sheet

(56) References Cited

U.S. PATENT DOCUMENTS

| | | | |
|---|---|---|---|
| 6,134,431 A * | 10/2000 | Matsumoto et al. | 455/411 |
| RE36,946 E * | 11/2000 | Diffie et al. | 380/278 |
| 6,463,534 B1 * | 10/2002 | Geiger et al. | 713/168 |
| 6,628,652 B1 * | 9/2003 | Chrin et al. | 370/386 |
| 6,741,848 B2 * | 5/2004 | Timonen et al. | 455/405 |
| 6,934,838 B1 * | 8/2005 | Boyce et al. | 713/156 |
| 6,980,796 B1 * | 12/2005 | Cuellar et al. | 455/410 |
| 7,017,041 B2 * | 3/2006 | Sandhu et al. | 713/156 |
| 7,028,186 B1 * | 4/2006 | Stenman et al. | 713/173 |
| 7,107,620 B2 * | 9/2006 | Haverinen et al. | 726/29 |
| 2004/0103283 A1 * | 5/2004 | Hornak | 713/175 |

FOREIGN PATENT DOCUMENTS

| | | |
|---|---|---|
| JP | 11-355858 A | 12/1999 |
| JP | 2000-358059 A | 12/2000 |
| KR | 2001079161 * | 6/2001 ............... H04L 9/30 |
| WO | WO 00/72506 A1 | 11/2000 |
| WO | WO 01/31877 A2 | 5/2001 |
| WO | WO 01/02940 A1 | 11/2001 |

OTHER PUBLICATIONS

Putz S. et al: "Authentication schemes for third generation mobile radio systems" Personal; Indoor and Mobile Radio Communications, 1998. The Ninth IEEE Intern. Symposium on Boston, MA, USA Sep. 8-11, 1998, New York, NY, USA, IEEE, US, Sep. 8, 1998, pp. 126-130; XP010314761; ISBN: 0-7803-4872-9, p. 127, right column, last paragraph—p. 128, right column, paragraph 1.

Park CH-S: "On certificate-based security protocols for wireless mobile communication systems"; IEEE Network, IEEE Inc. New York, US, vol. 11, No. 5, Sep. 1, 1997, pp. 50-55; XP000699941; ISSN: 0890-8044 p. 52, right column, pragraph 2—p. 54, left column, paragraph 1.

* cited by examiner

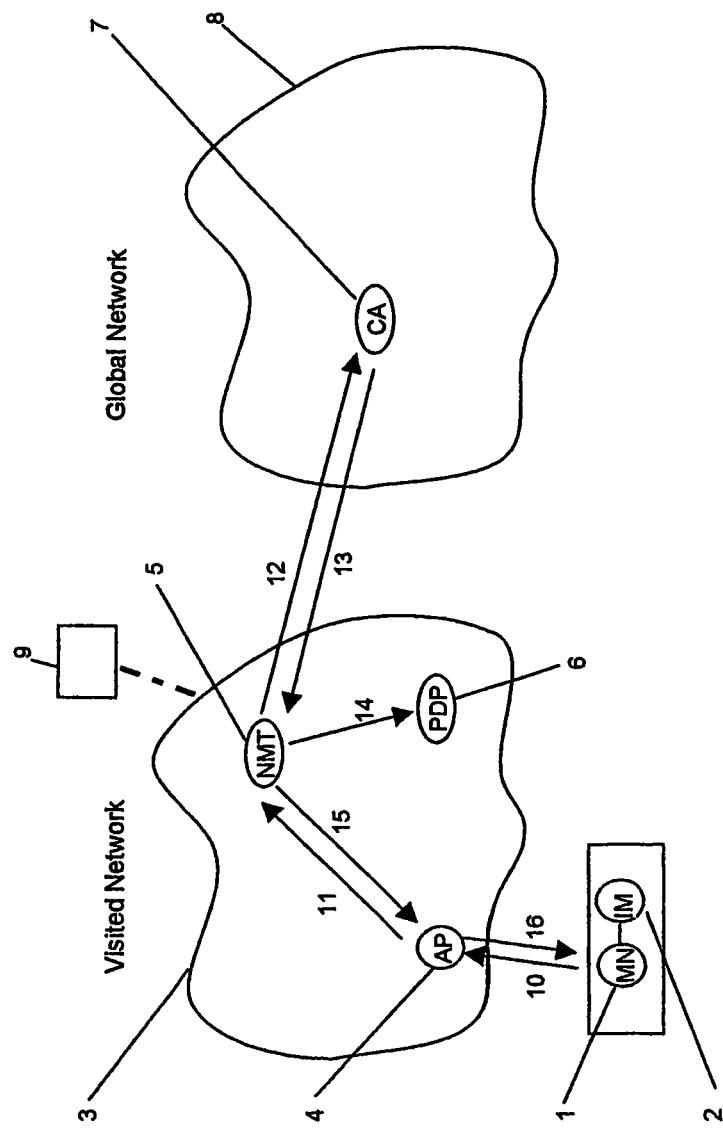

USE OF A PUBLIC KEY KEY PAIR IN THE TERMINAL FOR AUTHENTICATION AND AUTHORIZATION OF THE TELECOMMUNICATION USER WITH THE NETWORK OPERATOR AND BUSINESS PARTNERS

CLAIM FOR PRIORITY

This application is a national stage of International Application No. PCT/DE01/04461 filed Nov. 29, 2001, which was published in the German language on Jun. 12, 2003.

TECHNICAL FIELD OF THE INVENTION

The invention relates to devices and methods for checking the entitlement (authentication and/or authorization) of a subscriber with respect to an access device of a telecommunication network or with respect to a further service provider available via the network.

BACKGROUND OF THE INVENTION

According to the GSM standard, for example, a GSM mobile station (mobile phone) uses the SIM card of a subscriber, which contains a secret identifying the SIM card, the secret being also known to the network operator (shared secret), and a PIN number requested from the subscriber using the mobile radio station. A network operator can use an appropriate protocol (e.g. the challenge response protocol for GSM authentication) to identify a user's SIM card and to permit or refuse the subscriber use of the mobile radio network, for example. This method is, however, only suitable for authentication in n:1 relationships (authentication of, for example, n potential subscribers of a mobile radio network with respect to one network operator) but is not suitable for authenticating the user with respect to a plurality of potential business partners (not known definitively in advance) (n:m relationship).

SUMMARY OF THE INVENTION

An object of the present invention is therefore to facilitate simple and efficient authentication and authorization of a telecommunication subscriber for specific services or transactions via a telecommunication network with respect to an access device of a telecommunication network, which the telecommunication subscriber wishes to use via a telecommunication terminal with a telecommunication subscriber identity module.

The invention allows simple and efficient authentication of a telecommunication subscriber with respect to the telecommunication network, via which the subscriber communicates (to process services such as transactions) and also simple and efficient authentication and/or authorization with respect to third parties for predefined services such as transactions (confidential emails, banking transactions, payments, etc.).

The inventive method also functions with n:m relationships such as authentication of potential telecommunication subscribers by telecommunication subscriber identity modules in telecommunication terminals with respect to a plurality of (m) connectivity providers for peer-to-peer transactions between end subscribers, in ad hoc networks, etc., allows generation of a value-added facility (for the legal validity of orders, transfers, etc.) with the use of public key key pairs, allows multiples use of existing components (telecommunication subscriber identity modules) without increasing terminal-side hardware costs and provides a high level of security.

The method is particularly suitable for authenticating mobile terminals with respect to an internet protocol network for the use of the network itself and for services offered by third parties via the internet protocol network.

According to an aspect of the invention, a method is provided for checking the entitlement of a subscriber of a telecommunication terminal to utilize a service and/or use a telecommunication network, whereby an access device of a telecommunication network obtains at least one certificate and identity data from the telecommunication terminal, whereupon a network management device or a certification device checks whether the certificate confirms the identity data and has a positive status, whereby, if this is the case, a secret is transmitted to the access device, the secret encoded with at least the public key also being sent to the telecommunication terminal.

BRIEF DESCRIPTION OF THE DRAWINGS

FIG. 1 shows a schematic representation of an inventive entitlement check

DETAILED DESCRIPTION OF THE INVENTION

FIG. 1 shows a telecommunication terminal 1 (mobile node MN, e.g., a cellular mobile radio terminal for GSM, UMTS, etc.) with a connected (for example, insertable therein) telecommunication subscriber identity module 2 (e.g. SIM, W-SIM, UICC of a U-SIM, etc.), a visited telecommunication network 3 (for example, an internet protocol network of a mobile telecommunication network, etc.) with an access device 4 (AP=access point) to the telecommunication network 3, with a network management device 5 (NMT=network management tool) and an access management entity 6 (PDP=policy decision point). A certification device 7, which also provides a publicly accessible directory of certificates it has generated and the status data assigned to the certificates (in the same telecommunication network 3 or in a different telecommunication network 8 or with a different operator or in a trust center, which can be accessed by elements of the telecommunication network 3), can be contacted by the telecommunication network 3, which the user of the telecommunication terminal 1 wishes to use, to check identity data (MSISDN, etc.) and certificates stored in the telecommunication terminal 1 and to request the associated status data of the telecommunication subscriber 1 with regard to the implementation of services. These services, for example, include transport services, particularly use of the telecommunication network 3 itself, and/or application services, such as location-related services and/or transactions such as orders, transfers, etc. with providers 9 via the telecommunication network 3.

The user of the telecommunication terminal 1 wishes to prove their entitlement with respect to the operator of the network 3 and/or a provider 9 (within the telecommunication network 3 or outside the telecommunication network 3, for example, even a third party provider independent of the telecommunication network, offering their services only via the telecommunication network 3) to utilize services of the provider of 3 or 9, in other words, to implement an authentication and/or authorization. The authentication and/or authorization is effected with respect to the telecommunication network 3 or the provider of the service 9 (e.g. by the NMT (5)) once the identity data (MSISDN, etc.) and entitlement of the telecommunication subscriber 1 (or of the telecommunication subscriber identity module 2) has been checked.

The identity data and entitlement of the telecommunication subscriber 1 are checked here by checking one or a plurality of certificate(s) stored in the subscriber's telecommunication subscriber identity module 2 and using a private key of an asymmetrical (PKI-based) key pair also stored in the subscriber identity module 2. The check is, for example, implemented when an attempt is made to log the telecommunication subscriber terminal 1 onto the telecommunication network 3 as part of an authorization check method between the NMT, access device AP 4 and the telecommunication subscriber terminal 1 by checking the certificate/certificates and requesting the assigned status data in the certification device 7. The NMT verifies the validity of the certificate by an OCSP or CRL inquiry to CA 7.

When it wishes to be authorized with respect to the access device 4, the telecommunication subscriber identity module 1 inputs a PIN or another input specific to the telecommunication subscriber (fingerprint, etc.) and sends the access device 4 (for example, in response to a challenge by the access device 4 with a challenge number) identity data (relating to the identity of the telecommunication subscriber identity module or the terminal and/or the subscriber), one or a plurality of certificates (that can be generated from identity or assigned entitlement data, a public key of an asymmetrical key pair with a certificate generation method known only to the certification device 7) and protection signed by the private key from the telecommunication subscriber identity module against unauthorized repetition of an intercepted request by a third party (replay protection, nonce). The access point (AP, 4) checks correct delivery (e.g. challenge sufficiently recent, once correct and signed by means of the private key stored in the subscriber identity module) and transmits the certificate(s) to a network management device 5 (NMT=network management tool) responsible for part of the network 3 or the entire network 3 in stage 11.

In stage 12, the network management device 5 sends the certificate(s) to a certification device 7 (CA=certification authority), which uses an OCSP responder and a list of revoked certificates (certificate revocation list, CRL) to check the validity of the certificate(s) and the correctness of the identity data and, in some cases, entitlements given and provides information about the status (e.g. valid/invalid, etc.) of the certificate(s) and, in some cases, the entitlements of the telecommunication subscriber. The certificate confirms the identity data, if the certification device can generate the identity data from the certificate using a method known to it.

If the public key and the identity/entitlements of the telecommunication subscriber 1, 2 and/or the mobile radio terminal can be obtained from the certificate(s) by the certification device 7 and the status information (certificate not expired, not revoked, entitlements, etc.) can be determined, notification of the status of the certificate is given by the certification device 7 to the network management device 5 in the network 3 (13). The network management device 5 uses the status data and entitlements provided to decide on the scope of the entitlement of the MN 1 to utilize services and resources of the telecommunication network 3 and informs the access management entity PDP 6 of this in stage 14. Depending on this decision, the PDP 6 then transmits a corresponding policy to the AP 4 to release the use of the telecommunication network 3 for the telecommunication subscriber 1 or it remains blocked in the event of a completely negative decision on the part of the NMT 5.

The network management device 5 can notify the network 3 centrally at the request of third parties 9, whether and for which services, etc. a mobile radio terminal (1) is currently deemed to be entitled by the certification device 7. In the case of a positive certificate status (certificate valid, etc.) a secret (e.g. session key) generated by the NMT (5) with an encoding method used in the network 3 is also sent to the access device 4 and decoded there. The same secret is also encoded by the network management device 5 with the public key of the telecommunication identity module 2 (which public key can be obtained by the network management device at the start of the logging in process for the terminal 1 via the access device 4 in stage 10). The NMT 5 can also transmit its own certificate via the AP 4 to the NM 1. The secret is then decoded by the access device 4 with the key known to it (and provided in the telecommunication network) and in stage 16 the secret, which is still encoded with the public key of the telecommunication subscriber identity module 2 is transmitted to the telecommunication subscriber identity module 2. The private key associated with the public key is also stored in the telecommunication subscriber identity module 2 and this is used to decode the secret. This secret can then be used, for example, for confidential communication between the terminal 1 and the access device 4.

The access device (4) adds the subscriber to a list of telecommunication subscribers with access to the telecommunication network (3) and/or service (9), and grants access to the telecommunication network and/or service (9) only to subscribers included in the list.

A telecommunication terminal 1 with the telecommunication subscriber identity module 2 can also utilize further services and resources, order goods, make electronic payments, etc. with respect to a third party (9) for example (depending on what the certificate(s) permit(s)), whereby the third party (9) either confirms the degree of entitlement at a device NMT 5 of the telecommunication network 3 or requests this from the CA 7 (see above).

The invention claimed is:

1. A method for checking entitlement of a subscriber of a telecommunication terminal authorized for a telecommunication network to utilize a service and/or a visited telecommunication network, comprising:
   obtaining, by an access device of the visited telecommunication network, at least one certificate and identity data from the telecommunication terminal;
   checking to establish whether the certificate confirms the identity data and has a positive status with the telecommunication network by a network management device or a certification device of the visited telecommunication network; and
   transmitting a secret, if the identity data is confirmed and has a positive status, to the access device, encoding the secret with at least a public key of a subscriber identity module of the telecommunication terminal, and transmitting the encoded secret to the telecommunication terminal.

2. The method according to claim 1, wherein after the secret has been sent, the access device adds the subscriber to a list of telecommunication users with access to the telecommunication network and/or service, whereby the access device grants access to the telecommunication network and/or to the service only to users included in the list.

3. The method according to claim 1, wherein the access device sends the certificate obtained from the telecommunication terminal, the identity and replay protection to a network management device of the telecommunication network, which checks the certification, and if the check is positive, sends the secret to the access device and via the access device to the telecommunication terminal.

4. The method according to claim 1, wherein notification of the result of the check by the certification device is sent by the network management device to a service management device.

5. The method according to claim 1, wherein the certification device is arranged in a different network from the access device.

6. The method according to claim 1, wherein the certification device is arranged in a same telecommunication network as the access device.

7. The method according to claim 1, wherein a private key of the key pair is only stored in a telecommunication subscriber identity module of the telecommunication terminal.

8. The method according to claim 1, wherein the telecommunication network is an internet protocol network.

9. The method according to claim 1, wherein the telecommunication network is a cellular mobile radio network.

10. The method according to claim 1, wherein a plurality of attribute certificates can be used for a telecommunication subscriber identity module, a positive check of which permits the telecommunication terminal at least one type of transaction or other services or entitlements, respectively.

11. The method according to claim 1, wherein in the case of a positive check, the telecommunication terminal is permitted to use transactions or services provided by third parties via the telecommunication network.

12. The method according to claim 1, wherein
a telecommunication subscriber identity module stores a private key belonging to the public key, which it uses to decode the secret encoded within the public key.

13. A telecommunication network for checking entitlement of a subscriber of a telecommunication terminal authorized for a telecommunication network to utilize a service and/or a telecommunication network of a visited telecommunication network comprising:
an access device within the visited telecommunication network for receiving a certificate and identity data sent from the telecommunication terminal;
a certification device within the visited telecommunication network which is accessed with a certificate generation method for generating certificates from public keys, the certification device confirming the validity of a certificate and associated status data on request from the telecommunication network, whereupon if the validity is confirmed, the visited network is operable to transmit a secret to the access device, encode the secret with at least a public key of a subscriber identity module of the telecommunication terminal, and transmit the encoded secret to the telecommunication terminal, whereby access of a telecommunication terminal to a service of a provider permitted for holders of a certificate is only granted by a device of the telecommunication network if the check on a certificate of the telecommunication terminal by the certification device using the public key was successful.

\* \* \* \* \*